(12) United States Patent
Wang et al.

(10) Patent No.: US 10,743,713 B2
(45) Date of Patent: Aug. 18, 2020

(54) COOKING DEVICE WITH INSET DISPERSING PATTERN

(71) Applicant: WHIRLPOOL CORPORATION, Benton Harbor, MI (US)

(72) Inventors: Yifan Wang, St. Joseph, MI (US); John Jay Myers, Saugatuck, MI (US); Karen Mazza, St. Joseph, MI (US); Laura Battiston, Clinton Township, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 287 days.

(21) Appl. No.: 15/786,183

(22) Filed: Oct. 17, 2017

(65) Prior Publication Data
US 2019/0110482 A1    Apr. 18, 2019

(51) Int. Cl.
*A47J 37/10* (2006.01)
*F24C 15/16* (2006.01)
*A21B 3/15* (2006.01)

(52) U.S. Cl.
CPC .............. *A47J 37/10* (2013.01); *A21B 3/15* (2013.01); *F24C 15/16* (2013.01)

(58) Field of Classification Search
CPC ........... A21B 3/15; A47J 37/00; B65D 81/261
USPC ................. 99/339, 375, 425, 446; 219/450.1
See application file for complete search history.

(56) References Cited

U.S. PATENT DOCUMENTS

| | | | |
|---|---|---|---|
| 1,733,450 A * | 10/1929 | Detwiler | A47J 37/10 99/340 |
| 2,501,799 A | 3/1950 | Vredenburg | |
| 3,958,504 A | 5/1976 | Levin | |
| 4,676,151 A | 6/1987 | Gorsuch et al. | |
| 1,732,910 A | 10/1992 | Possons | |
| 5,347,978 A | 9/1994 | Zuran | |
| 5,351,608 A | 10/1994 | Muchin et al. | |
| 5,503,063 A | 4/1996 | Sebald | |
| 5,776,532 A | 7/1998 | Wang | |
| 5,800,853 A | 9/1998 | Wang | |
| 6,363,842 B1 * | 4/2002 | Lin | A47J 36/38 126/299 D |

(Continued)

FOREIGN PATENT DOCUMENTS

| | | |
|---|---|---|
| CN | 290542 A | 5/1953 |
| EP | 2745756 A1 | 6/2014 |
| FR | 1161591 A | 9/1958 |

*Primary Examiner* — Thien S Tran
(74) *Attorney, Agent, or Firm* — Price Heneveld LLP

(57) ABSTRACT

A cooking device includes a bottom wall having a raised cooking surface surrounded by an overflow trough. A liquid dispersion pattern is disposed on the raised cooking surface and includes a plurality of channels configured to channel liquid towards a peripheral edge of the raised cooking surface. Each channel includes a first end disposed in a first plane and a second end disposed in a second plane that is vertically offset form the first plane. A body portion of each channel interconnects the first and second ends. The channels are spaced apart to define support ribs therebetween which are configured to abuttingly support a food substrate on the cooking device during a cooking procedure. With the channels positioned between the support ribs, the food substrate is supported in an intermittent manner on the cooking surface as compared to full contact support found in conventional cooking devices.

20 Claims, 11 Drawing Sheets

(56) References Cited

U.S. PATENT DOCUMENTS

| | | | |
|---|---|---|---|
| 6,439,110 B1 * | 8/2002 | Lin | A47J 37/108 |
| | | | 126/390.1 |
| 6,463,844 B1 | 10/2002 | Wang | |
| 7,011,014 B2 | 3/2006 | Siegel et al. | |
| 7,258,246 B2 | 8/2007 | Tingley | |
| 7,921,992 B2 | 4/2011 | LaRue et al. | |
| 9,302,842 B2 | 4/2016 | Wallace | |
| 2004/0149142 A1 | 8/2004 | Groll | |
| 2005/0204931 A1 * | 9/2005 | Cheng | A47J 37/067 |
| | | | 99/422 |
| 2009/0096150 A1 | 4/2009 | Cihan et al. | |
| 2010/0065571 A1 | 3/2010 | Olsen | |
| 2012/0199016 A1 | 8/2012 | Droese | |
| 2015/0296806 A1 | 10/2015 | Stecher | |

* cited by examiner

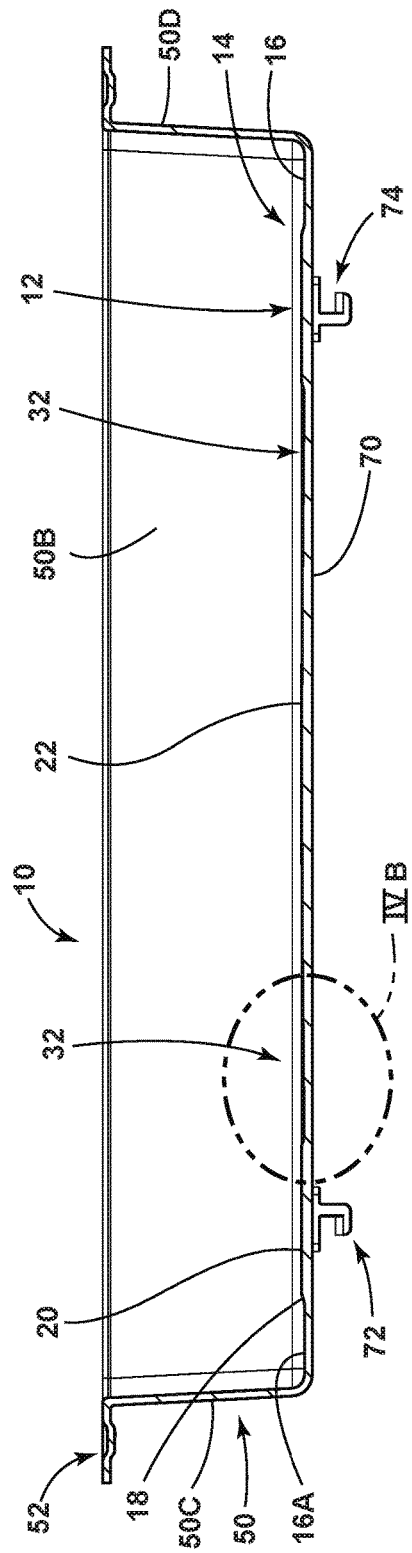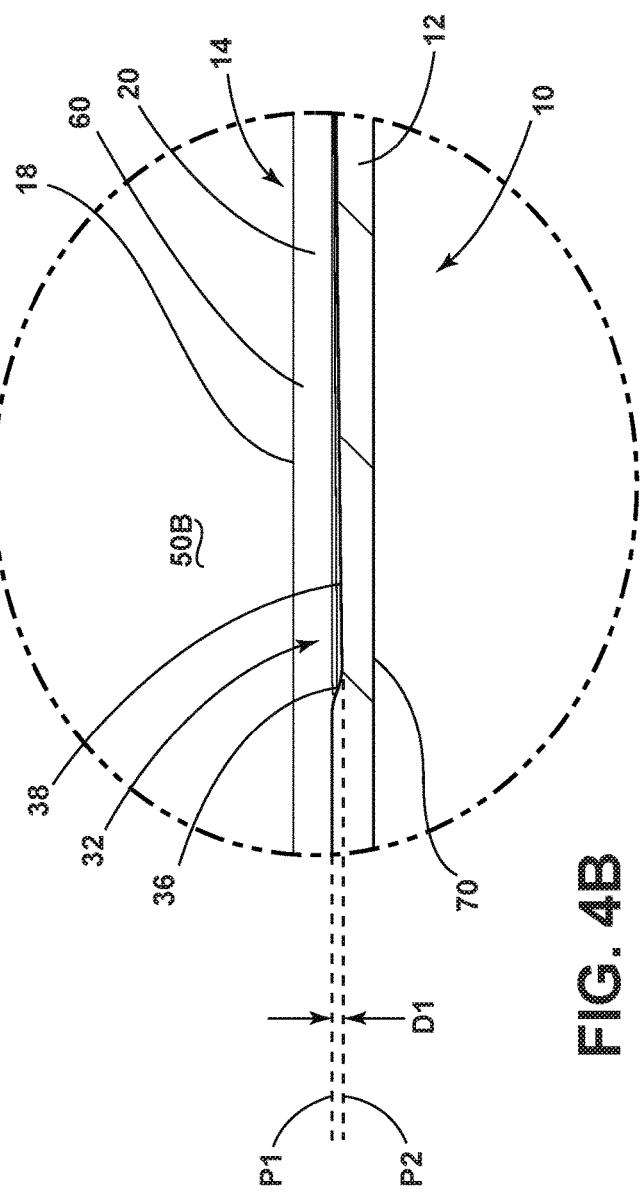

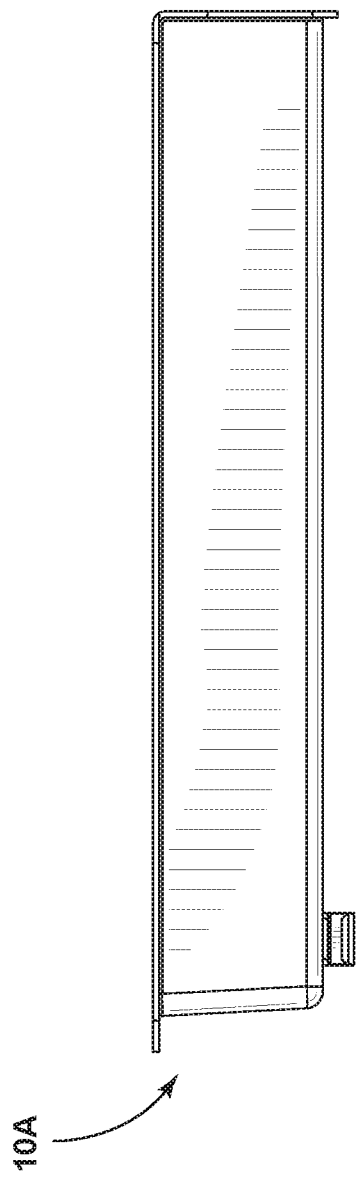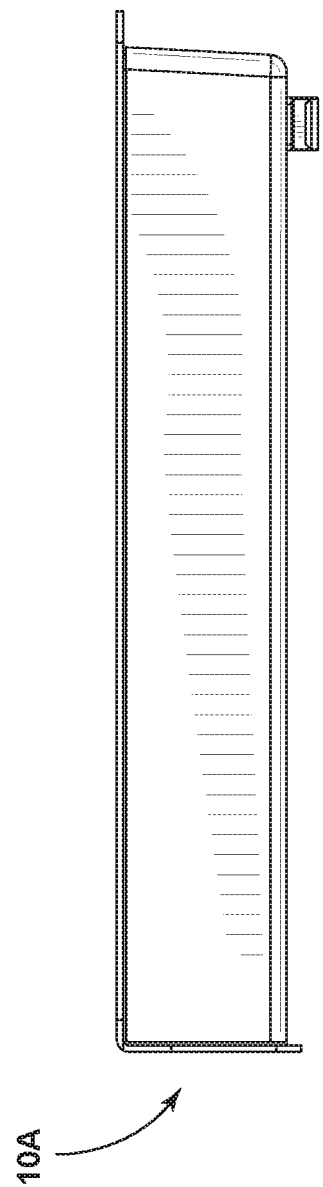
FIG. 10
FIG. 11

COOKING DEVICE WITH INSET DISPERSING PATTERN

BACKGROUND

The present device generally relates to a cooking device, and more specifically, to a cooking device having a cooking surface with a multi-level pattern disposed thereon for dispersing liquids produced or used during a cooking procedure.

SUMMARY

In at least one aspect, a cooking device includes a bottom wall with a raised cooking surface. A recessed perimeter portion surrounds the raised cooking surface. A liquid dispersion pattern is disposed on the raised cooking surface and includes a plurality of channels extending outwardly from a central portion of the raised cooking surface. Each channel includes a first end disposed adjacent to the central portion of the raised cooking surface and a second end spaced-apart from the first end and vertically offset from the first end. Further, each channel defines a drainage path from the first end to the second end. A generally upright wall extends along at least a portion of the recessed perimeter portion of the bottom wall.

In at least another aspect, a cooking device includes a cooking surface having first and second portions separated by a central portion. The cooking surface further includes a peripheral edge with first and second opposing sides. A first set of channels is disposed within the first portion of the cooking surface. The channels of the first set of channels outwardly extend from the central portion of the cooking surface towards the first side of the peripheral edge. A second set of channels is disposed within the second portion of the cooking surface. The channels of the second set of channels outwardly extend from the central portion of the cooking surface towards the second side of the peripheral edge. Each channel of the first and second sets of channels includes an end portion disposed inwardly from the peripheral edge. The end portion of each channel is recessed from the central portion.

In at least another aspect, a cooking device includes a bottom wall having a raised cooking surface surrounded by an overflow trough. A liquid dispersion pattern is disposed on the raised cooking surface and includes a plurality of channels configured to channel liquid towards a peripheral edge of the raised cooking surface from a central portion of the raised cooking surface. Each channel includes a first end disposed in a first plane and a second end disposed in a second plane and a body portion interconnecting the first and second ends.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIG. 4A is a cross-sectional view of the cooking device of FIG. 2 taken at line IVA showing contours of channels of the liquid dispersion pattern;

FIG. 4B is an enhanced view of the cooking device of FIG. 4A taken at location IVB;

FIG. 10 is a first side elevational view of the cooking device of FIG. 6;

FIG. 11 is a second side elevational view of the cooking device of FIG. 6;

DETAILED DESCRIPTION OF EMBODIMENTS

Figure 1:
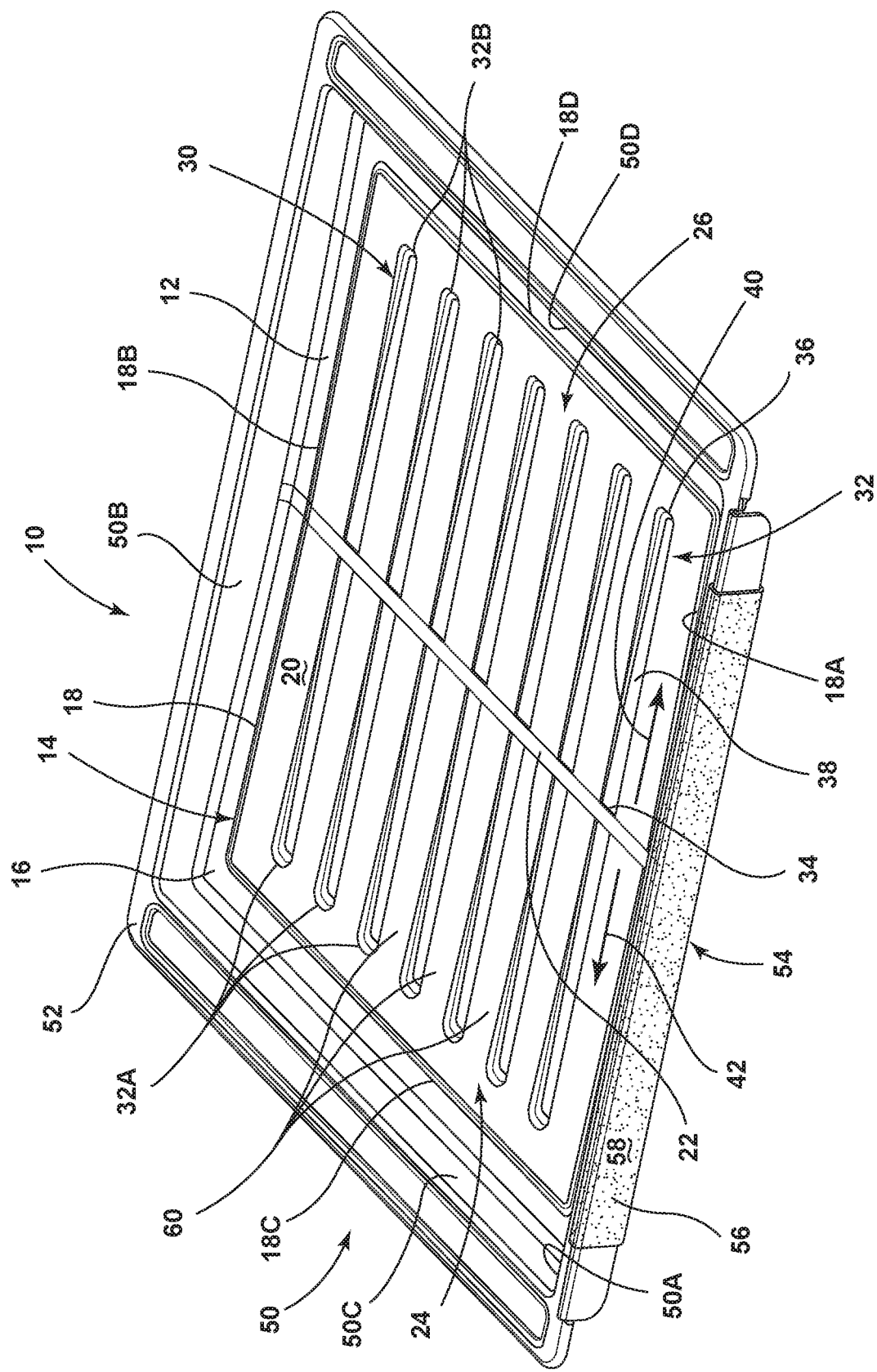
FIG. 1 is a top perspective view of a cooking device having a liquid dispersion pattern according to an embodiment.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiment illustrated in FIG. 1, reference numeral 10 generally designates a cooking device according to an embodiment of the present concept. The cooking device 10 may also be referred to herein as a baking device, a baking sheet, a roasting pan, or other like cooking vessel. Specifically, the features of the cooking device 10 disclosed herein can be incorporated into various types of cooking vessels, such that the features of the cooking device 10 disclosed herein are not meant to be limited to any one type of cooking vessel. Thus, FIGS. 1-5 depict only an exemplary embodiment of a cooking device of the present concept.

As shown in FIG. 1, the cooking device 10 includes a bottom wall 12 having a cooking surface 14 defined on an upper surface of the bottom wall 12. The cooking surface 14 is surrounded by a recessed perimeter portion 16 of the bottom wall 12, such that the cooking surface 14 is a raised cooking surface. The recessed perimeter portion 16 of the bottom wall 12 may also be referred to herein as an overflow trough or perimeter trough that is configured to collect juices and cooking liquids produced by a food substrate or used in a cooking procedure, as further described below. The cooking surface 14 includes a peripheral edge 18 surrounding an upper surface 20 of the cooking surface 14. The peripheral edge 18 includes front and rear portions 18A, 18B that are interconnected by first and second side portions 18C, 18D.

A central portion 22 of the cooking surface 14 extends between the front and rear portions 18A, 18B of the peripheral edge 18 in the embodiment shown in FIG. 1. In use, the upper surface 20 of the cooking surface 14 is configured to abuttingly support a food substrate during a cooking procedure, as further described below.

As further shown in FIG. 1, a liquid dispersion pattern 30 is disposed on and inset from the upper surface 20 of the cooking surface 14. In the embodiment of FIG. 1, the liquid dispersion pattern 30 includes a plurality of channels 32A, 32B disposed in first and second portions 24, 26 of the cooking surface 14. The first and second portions 24, 26 of the cooking surface 14 are shown as being separated by the central portion 22 of the cooking surface 14 in the embodiment of FIG. 1. In FIG. 1, reference numeral 32 indicates a single channel of the plurality of channels of the liquid dispersion pattern 30 and is used herein to describe the common features of the plurality of channels. Specifically, channel 32 includes a first end 34 and a second end 36 that are spaced-apart and interconnected by a body portion 38. The first end 34 is disposed adjacent to the central portion 22 of the cooking surface 14. The second end 36 is vertically offset from the first end 34 to define a drainage path 40, such that liquid to flows from the first end 34 to the second end 36 along the body portion 38 of the channel 32. Thus, the channels 32A, 32B define the plurality of channels of the liquid dispersion pattern 30 which, in the embodiment of FIG. 1, extend outwardly from the central portion 22 of the cooking surface 14 between first and second ends 34, 36 thereof. As shown in FIG. 1, the second end 36 of channel 32 is inset from the peripheral edge 18 of the cooking surface 14, such that the channel 32 does not communicate with the recessed perimeter portion 16 of the bottom wall 12. In this way, juices produced by a food substrate and cooking liquids used in a cooking procedure can be retained on the cooking surface 14 as a basting feature to a food substrate being prepared on the cooking device 10 of the present concept.

As further shown in FIG. 1, the drainage path 40 of channel 32 is mirrored in drainage path 42 of the channels 32A of the liquid dispersion pattern 30. Thus, the liquid dispersion pattern 30 includes an overall drainage path defined by drainage path 40 and drainage path 42 wherein cooking liquids drain away from the central portion 22 of the cooking surface 14 towards the peripheral edge 18 of the cooking surface 14 via of the plurality of channels 32A, 32B.

As further shown in FIG. 1, the cooking device 10 includes a generally upright perimeter wall 50 that extends upwardly from the recessed perimeter portion 16. Much like the peripheral edge 18, the upright perimeter wall 50 includes front and rear portions 50A, 50B that are interconnected by first and second side portions 50C, 50D. A rim portion 52 of the upright perimeter wall 50 extends orthogonally outward from the first and second side portions 50C, 50D and the rear portion 50B of the upright perimeter wall 50. A handle portion 54 is shown disposed on the front portion 50A. The rim portion 52 of the upright perimeter wall 50 can be used to carry the cooking device 10 on opposing sides thereof, and the handle portion 54 can be used to hold or move the cooking device 10 as well. In the embodiment shown in FIG. 1, the upright perimeter wall 50 of the cooking device 10 extends fully around the recessed perimeter portion 16, however, it is contemplated that the upright perimeter wall 50 may extend along only a portion of the recessed perimeter portion 16 in other embodiments. It is contemplated that the handle portion 54 comprises a pad 56 that is comprised of a heat resistant material, such as silicone, and provides coverage over the front portion 50A of the upright perimeter wall 50 as affixed thereto. The upright perimeter wall 50 is contemplated to be comprised of a metal material, such that, with the pad 56 in place, heat flux to a user's hand is reduced should a user accidentally come into contact with the cooking device 10 during or after a cooking procedure as compared to direct contact with the upright perimeter wall 50. The pad 56 includes an outer surface 58 that is contemplated to be a textured outer surface having protruding and recessed portions. With the textured contour of the outer surface 58 of the pad 56, contact by a user is limited to the protruding portions of the textured outer surface 58. In this way, the protruding portions define a reduced contact surface for the outer layer 58 of the pad 56, thereby reducing the amount of heat transfer to a user. It is further contemplated that the pad 56 is flexibly resilient to help a user grip the cooking device 10 by engaging the pad 56.

As further shown in FIG. 1, the plurality of channels 32A in the first portion 24 of the cooking surface 14 drain along the drainage path 42 towards the first side portion 50C of the upright perimeter wall 50. Further, the plurality of channels 32B in the second portion 26 of the cooking surface 14 drain along the drainage path 40 towards the second side portion 50D of the upright perimeter wall 50.

As further shown in FIG. 1, each of the channels of the plurality of channels 32A, 32B are spaced-apart from one another to define support ribs 60 positioned therebetween. The support ribs 60 are contemplated to be disposed within a common plane with the central portion 22 of the cooking surface 14 and thereby define an exposed surface for abuttingly supporting a food substrate thereon between the plurality of channels 32A, 32B. Further, it is also contemplated that the central portion 22 of the cooking surface 14 may be a raised central portion as compared to the support ribs 60.

Figure 2:
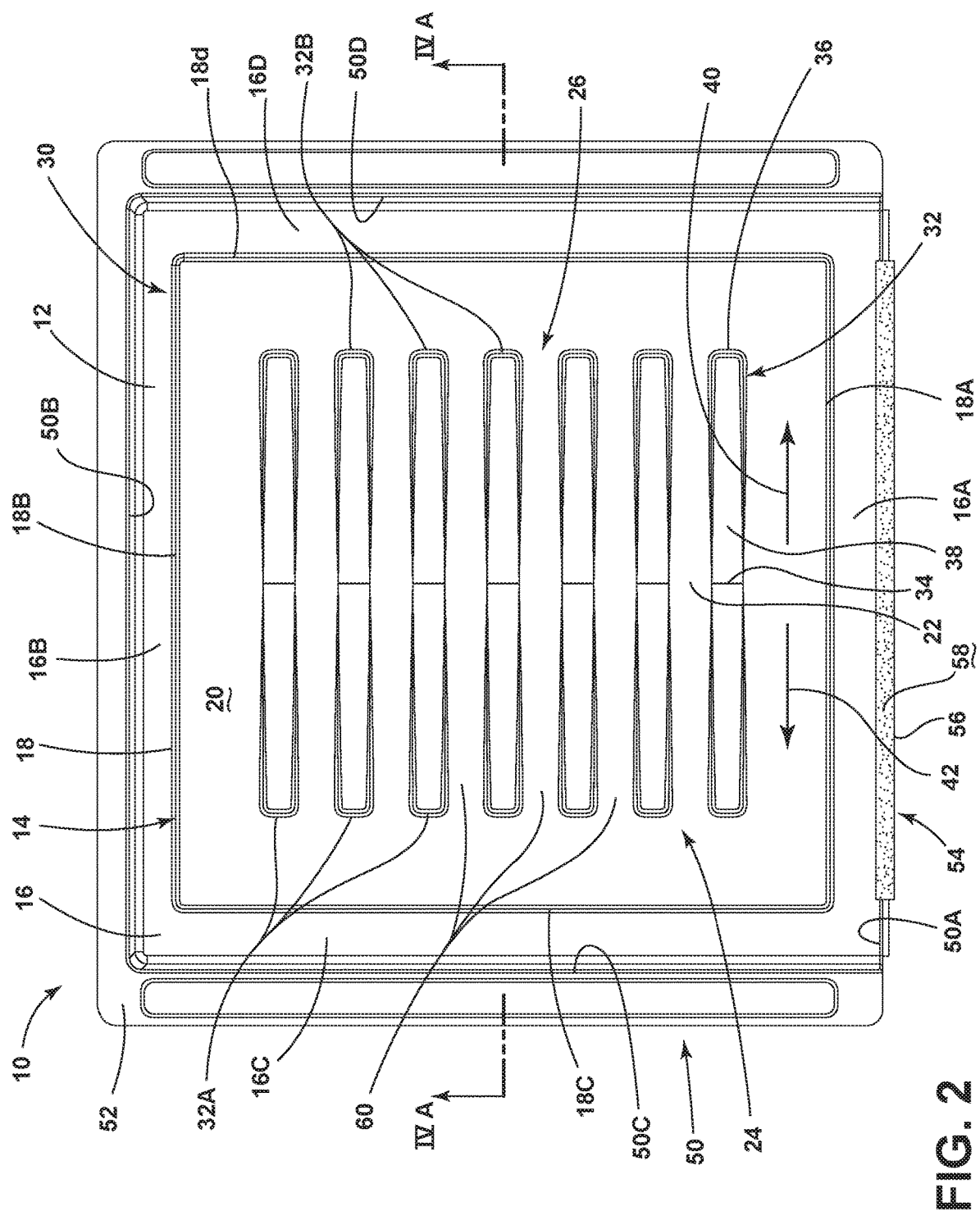
FIG. 2 is a top plan view of the cooking device of FIG. 1.

Referring now to FIG. 2, the recessed perimeter portion 16 of the bottom wall 12 is shown fully surrounding the cooking surface 14. Much like the peripheral edge 18 and the upright perimeter wall 50, the recessed perimeter portion 16 includes front and rear portions 16A, 16B that are interconnected by first and second side portions 16C, 16D to fully surrounding the cooking surface 14.

Figure 3:
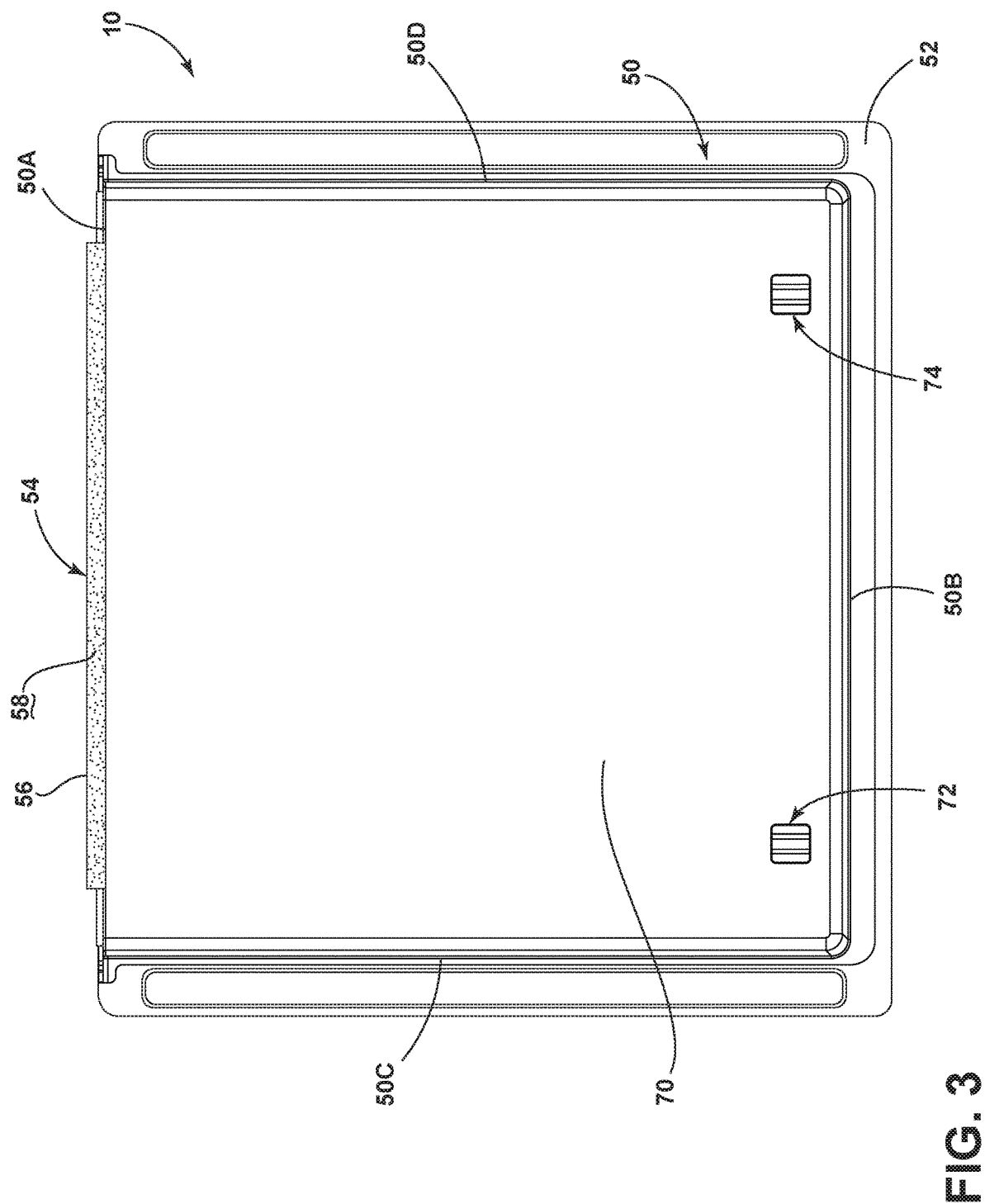
FIG. 3 is a bottom plan view of the cooking device of FIG. 1.

Referring now to FIG. 3, a lower surface 70 of the bottom wall 12 is shown having first and second engagement features 72, 74 outwardly extending therefrom. The engagement features 72, 74 may be positioned anywhere on the lower surface 70 of the bottom wall 12 of the cooking device 10, and can be used to secure the cooking device 10 to a rack, such as an oven rack, during a baking procedure.

Referring now to FIG. 4A, the cross-sectional view of the cooking device 10 shows the contours of the channels of the liquid dispersion pattern 30 (FIG. 1). As specifically shown in FIG. 4A, the recessed perimeter portion 16 includes a bottom wall 16E from which the upright perimeter wall 50 upwardly extends. Two channels 32 are shown in FIG. 4A as being inset from the peripheral edge 18 of the cooking surface 14, such that the channels 32 (and the dispersion pattern of which the channels 32 are a part) are contained within the cooking surface 14. In this way, the channels 32 of the cooking surface 14 do not communicate with the recessed perimeter portion 16.

Referring now to the enhanced view of FIG. 4B, the support rib 60 is shown disposed in a first plane P1. The first plane P1 is contemplated to be a common plane for the entirety of the upper surface 20 of the cooking surface 14. Thus, it is contemplated that central portion 22 of the cooking surface 14 is also disposed in the first plane P1. When the central portion 22 of the cooking surface 14 is a raised central portion, it is contemplated that the central portion 22 of the cooking surface 14 is disposed in a plane as positioned above the first plane P1. When the central portion 22 of the cooking surface 14 is disposed in the first plane P1, it is contemplated that the first end 34 (FIG. 1) of channel 32 is also disposed in the first plane P1. As further shown in FIG. 4B, the second end 36 of channel 32 is shown disposed in a second plane P2. The second plane P2 is shown as being vertically offset from the first plane P1, such that the second plane P2 is disposed lower than the first plane P1. In this way, the drainage paths 40, 42 discussed above drain from the first ends 34 to the second ends 36 of the channels 32 given the vertically offset positions of the first and second planes P1, P2 in which the first and second ends 34, 36 are disposed, respectively. In FIG. 4B, the first and second planes P1, P2 are shown as being offset a vertical distance D1. It is further contemplated that the bottom wall 16E of the recessed perimeter portion 16 is disposed in the second plane P2. In other embodiments, the bottom wall 16E of the recessed perimeter portion 16 may be disposed in a third plane positioned above or below second plane P2, but is contemplated in all embodiments that the third plane will be positioned below the first plane P1.

Figure 5:
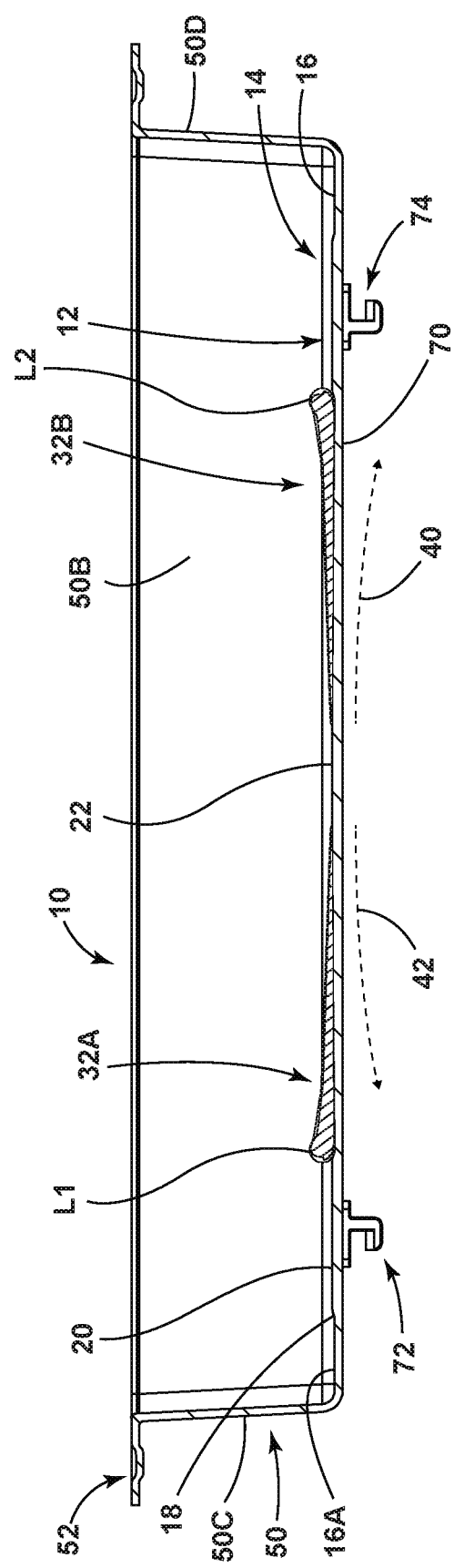
FIG. 5 is a side elevational view of the cooking device of FIG. 4A, showing liquid disposed in the channels of the dispersion pattern.
Figure 6:
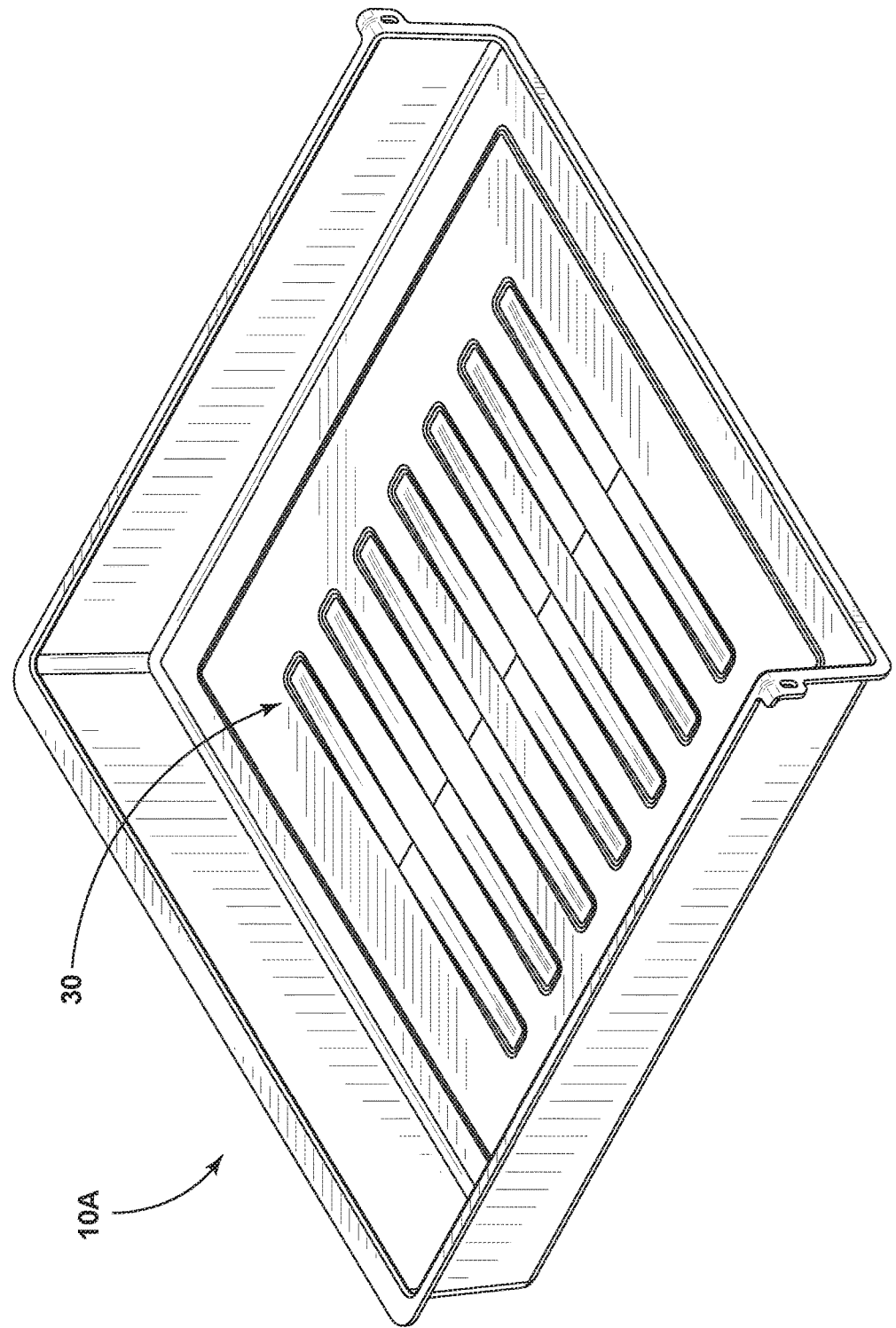
FIG. 6 is a front perspective view of another embodiment of a cooking device of the present concept.
Figure 7:
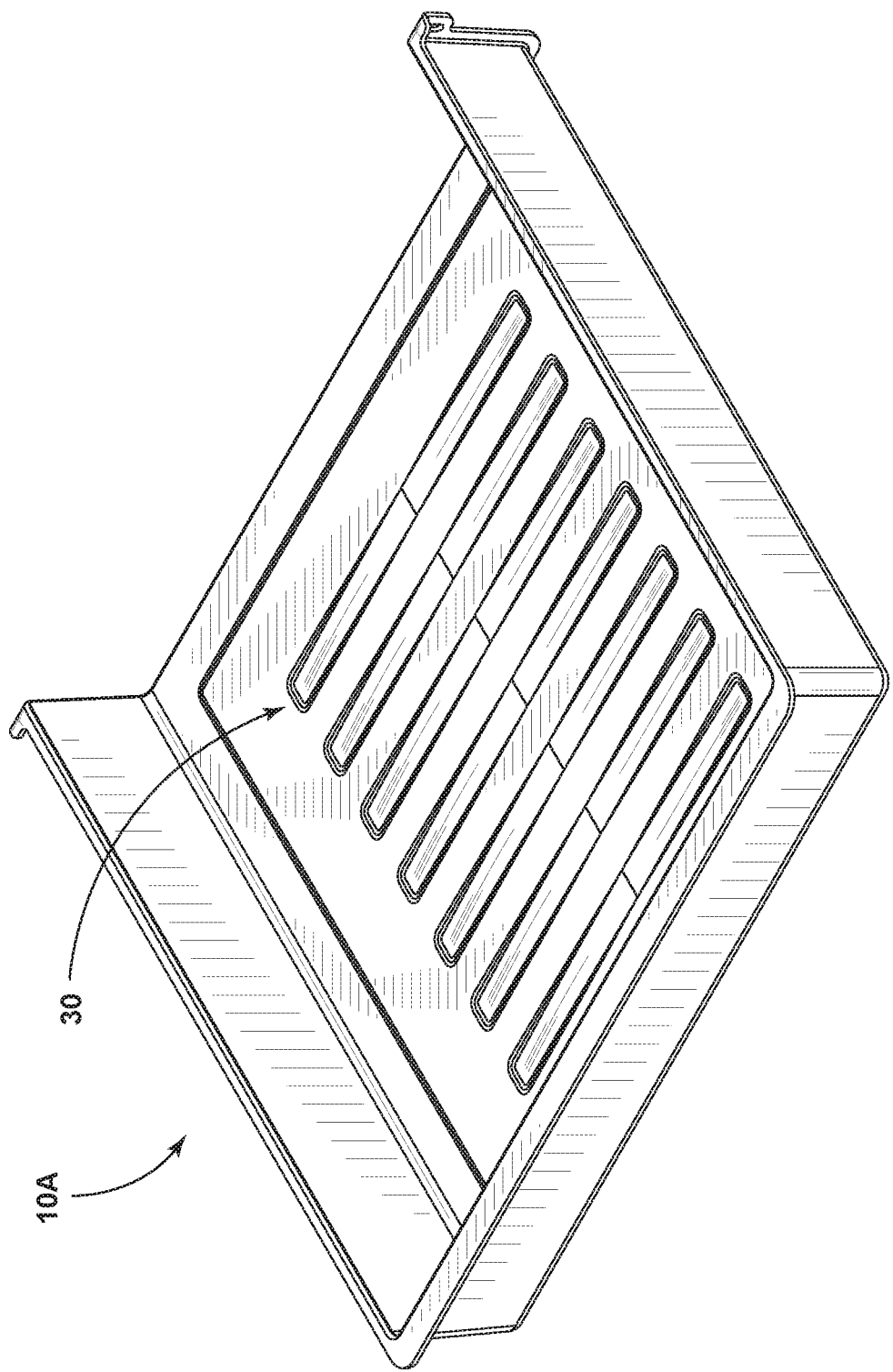
FIG. 7 is a rear perspective view of the cooking device of FIG. 6.
Figure 8:
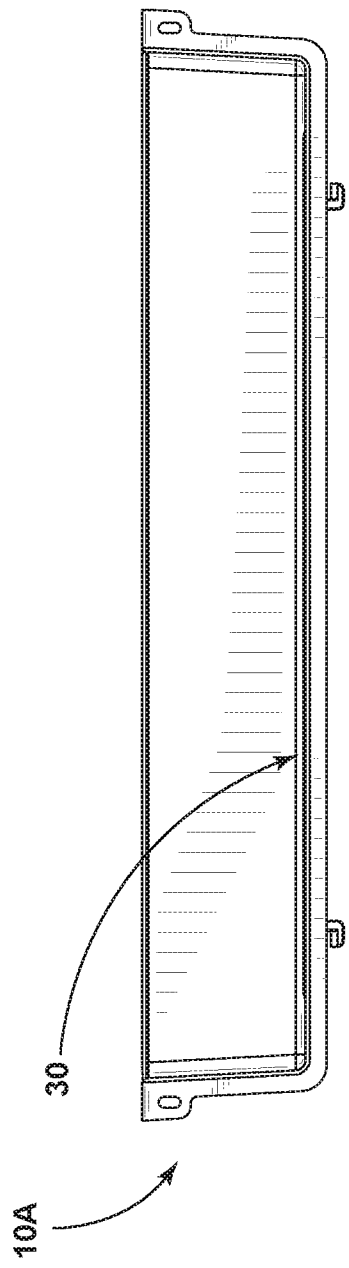
FIG. 8 is a front elevational view of the cooking device of FIG. 6.
Figure 9:
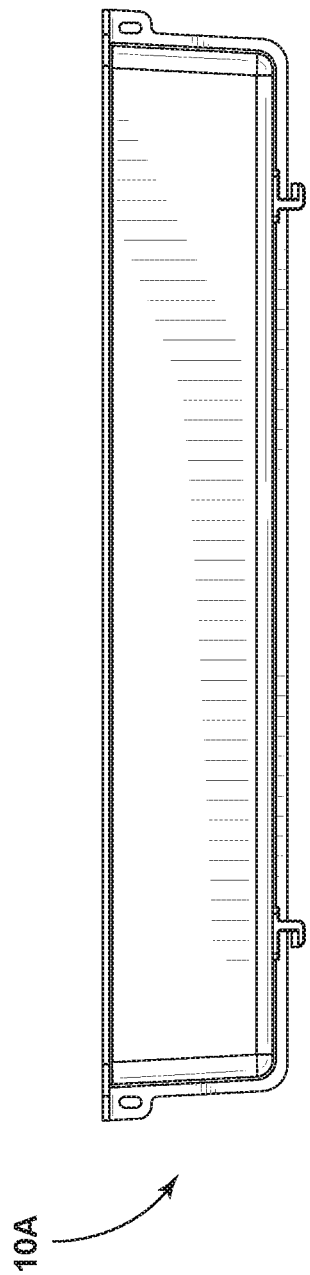
FIG. 9 is a rear elevational view of the cooking device of FIG. 6.
Figure 12:
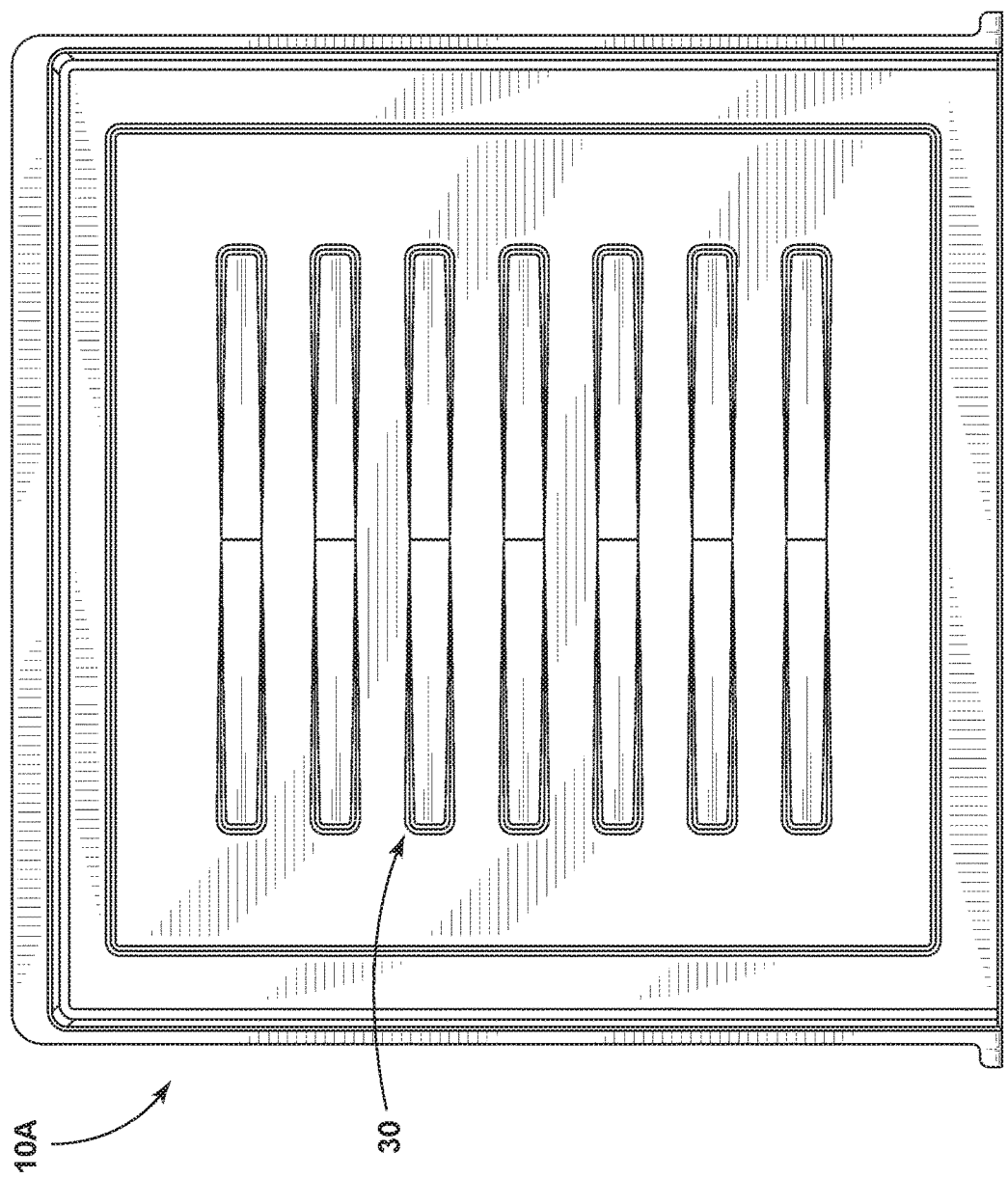
FIG. 12 is a top plan view of the cooking device of FIG. 6.

Referring now to FIG. 5, liquids L1, L2 are shown disposed in respective channels 32A, 32B. As illustrated in FIG. 5, the liquids L1, L2 have moved along the respective drainage paths 42, 40 towards the second ends 36 of the respective channels 32A, 32B. It is contemplated that the liquids L1, L2 may be produced by food substrate supported on the upper surface 20 of the cooking surface 14 during a cooking procedure. Further, it is contemplated that the liquids L1, L2 may be provided by a user to baste a food substrate supported on the cooking surface 14. If the liquids L1, L2 fill the channels 32A, 32B, it is contemplated that the liquids L1, L2 will spill over from the cooking surface 14 into the recessed perimeter portion 16, such that the recessed perimeter portion 16 defines an overflow trough for the channels 32A, 32B.

In use, the liquid dispersion pattern 30 of the cooking device 10 is configured to provide an easy cleanup of liquids produced or used during a cooking procedure by channeling the liquids within the channels 32A, 32B. Further, the spaced-apart configuration of the channels 32A, 32B provides for support ribs 60 that abuttingly support a food substrate (along with the central portion 22 of the cooking surface 14) on only a select portion of the cooking surface 14. In this way, a food substrate positioned on the upper surface 20 of the cooking surface 14 is not 100% in contact with the upper surface 20 of the cooking surface 14, but rather positioned on only a portion of the cooking surface 14 defined by the support ribs 60 and the central portion 22 of the cooking surface 14. In this way, the cooking device 10 of the present concept provides for a fully supportive cooking surface 14 which only contacts a food substrate on select portions thereof. In this way, the cooking device 10 of the present concept provides for a cooking surface 14 that is easier to clean as compared to a cooking surface which is in full contact with a food substrate during a cooking procedure.

Figure 13:
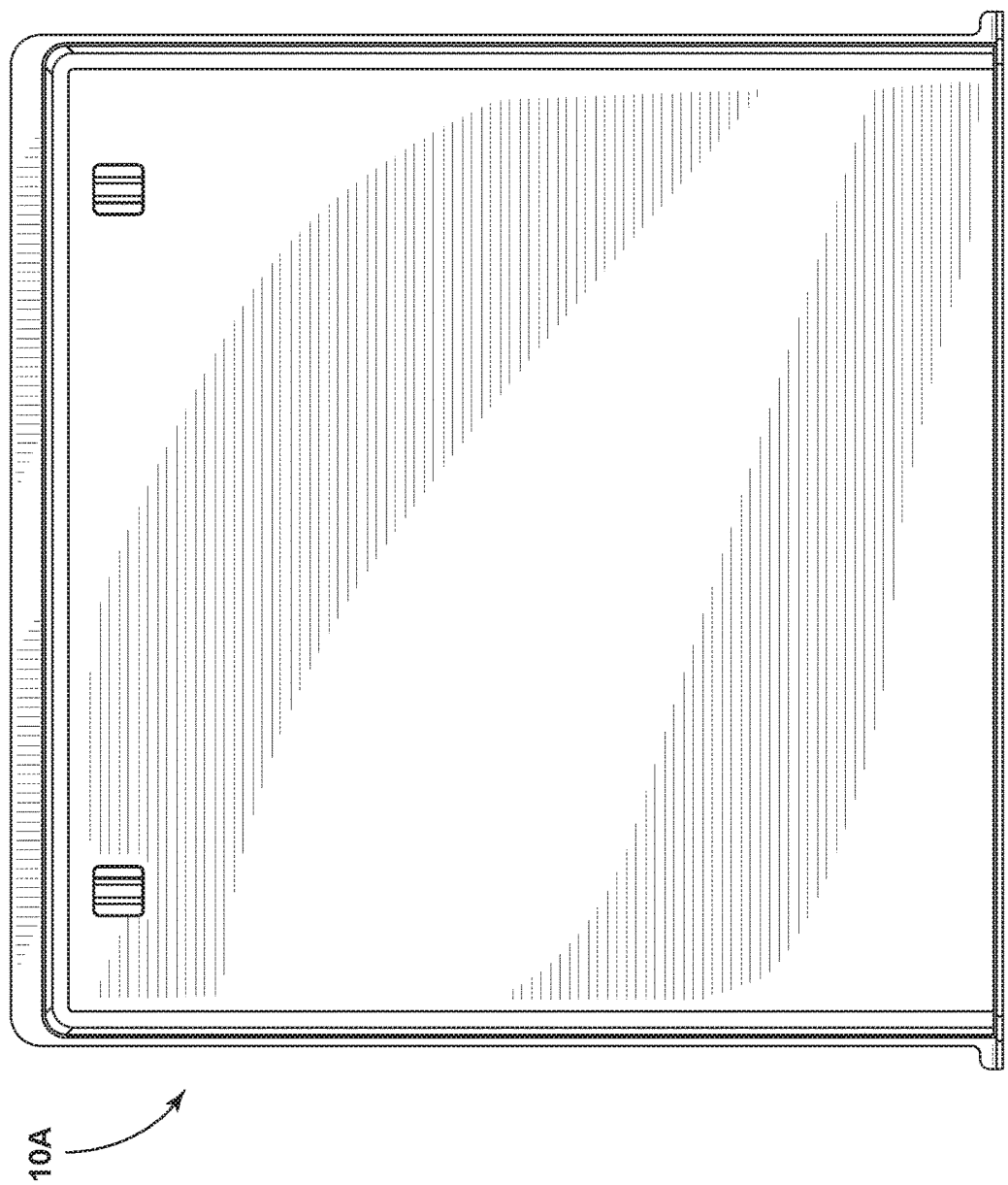
FIG. 13 is a bottom plan view of the cooking device of FIG. 6.

A cooking device 10A according to another embodiment is illustrated in a variety of views, including a front perspective view (FIG. 6), a rear perspective view (FIG. 7), a front elevational view (FIG. 8), a rear elevational view (FIG. 9), a first side elevational view (FIG. 10), a second side elevational view (FIG. 11), a top plan view (FIG. 12), and a bottom plan view (FIG. 13). As shown in FIGS. 6-13, the cooking device 10A includes a liquid dispersion pattern 30 that is the same as the liquid dispersion pattern 30 described above with reference to FIGS. 1-5.

The inventors hereby describe and possess the overall appearance shown in FIGS. 1-13, the corresponding descriptions, and any and all parts and/or portions thereof and/or combinations thereof. Further, the inventors and the Applicant regard the disclosed designs as the overall appearance shown in FIGS. 1-13, and any and all parts and/or portions thereof and/or combinations thereof. As such, the inventors and the Applicant reserve the right to separately claim, including by inserting a boundary around, any part, portion, element and/or combination of the disclosed design(s), and also reserve the right to replace any solid line in any current or future line drawings with a broken line to disclaim any part, portion, element or combination thereof of the disclosed design(s) or to replace any broken line in any current or future line drawings with a solid line to claim any part, portion, element or combination thereof of the disclosed design(s).

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A cooking device comprising:
   a horizontal raised cooking surface defining a first horizontal plane between first and second portions of the raised cooking surface and having a central portion disposed in the first horizontal plane;
   a bottom wall having a recessed perimeter portion surrounding the raised cooking surface;
   a liquid dispersion pattern disposed on the raised cooking surface, wherein the liquid dispersion pattern includes a plurality of channels extending outwardly from a central portion of the raised cooking surface, each channel including a first end disposed adjacent to the central portion of the raised cooking surface and a second end spaced-apart from the first end and vertically offset from the first end to define a second plane and a drainage path from the first end to the second end; and
   an upright wall extending along at least a portion of the recessed perimeter portion of the bottom wall.

2. The cooking device of claim 1, wherein the upright wall includes front and rear portions interconnected by opposing first and second side portions.

3. The cooking device of claim 2, wherein the liquid dispersion pattern includes one or more of the second ends of the plurality of channels being disposed on a first portion of the raised cooking surface adjacent the first side portion of the upright wall.

4. The cooking device of claim 3, wherein the liquid dispersion pattern includes one or more of the second ends of the plurality of channels being disposed on a second portion of the raised cooking surface adjacent the second side portion of the upright wall.

5. The cooking device of claim 4, wherein the drainage path includes first and second paths, the first path directed from the central portion of the raised cooking surface towards the first side portion of the upright wall within the first portion of the raised cooking surface, the second path directed from the central portion of the raised cooking surface towards the second side portion of the upright wall within the second portion of the raised cooking surface.

6. The cooking device of claim 1, wherein the channels of the plurality of channels are spaced-apart to define support ribs therebetween.

7. The cooking device of claim 6, wherein the support ribs are disposed in a common plane with the central portion of the raised cooking surface.

8. The cooking device of claim 6, wherein the support ribs of the raised cooking surface are disposed in the first plane, and further wherein the second ends of each channel of the plurality of channels and the recessed perimeter portion are disposed in the second plane that is vertically offset from the first plane.

9. The cooking device of claim 6, wherein the second ends of each channel of the plurality of channels and the recessed perimeter portion are disposed in a common plane.

10. A cooking device comprising:
    a horizontal cooking surface having first and second portions separated by a central portion to define a first plane, the cooking surface having a peripheral edge with first and second opposing sides;
    a first set of channels disposed within the first portion and outwardly extending from the central portion of the cooking surface towards the first side of the peripheral edge;
    a second set of channels disposed within the second portion and outwardly extending from the central portion of the cooking surface towards the second side of the peripheral edge; and
    wherein each channel of the first and second sets of channels includes an end portion disposed inwardly from and adjacent to the peripheral edge, and further wherein the end portion is recessed from the central portion to define a second plane.

11. The cooking device of claim 10, wherein the channels of the first and second sets of channels are spaced-apart from one another to define support ribs therebetween.

12. The cooking device of claim 10, wherein the central portion extends between front and rear portions of the peripheral edge.

13. The cooking device of claim 10, including:
    a perimeter trough disposed around the cooking surface, the perimeter trough having a bottom wall disposed in the first plane that is horizontal and vertically offset from the second plane, wherein an upper surface of the cooking surface is disposed in the second plane.

14. The cooking device of claim 13, including:
    a perimeter wall extending upwardly from and surrounding the bottom wall of the perimeter trough, wherein the perimeter wall includes a heat resistant pad disposed on a portion thereof, the heat resistant pad having a textured outer surface.

15. A cooking device, comprising:
    a bottom wall having a horizontal raised cooking surface that defines a first plane surrounded by an overflow trough; and
    a liquid dispersion pattern having a plurality of channels configured to channel liquid towards a peripheral edge of the raised cooking surface from a central portion of the raised cooking surface, wherein each channel includes a first end disposed in the first plane and a second end disposed in a second plane vertically offset from the first plane, and a body portion interconnecting the first and second ends.

16. The cooking device of claim 15, wherein the peripheral edge of the raised cooking surface includes front and rear portions and opposing first and second side portions.

17. The cooking device of claim 16, wherein the plurality of channels includes first and second sets of channels, wherein the second ends of the first set of channels are disposed adjacent to the first side portion of the peripheral edge of the raised cooking surface.

18. The cooking device of claim 17, wherein the second ends of the second set of channels are disposed adjacent to the second side portion of the peripheral edge of the raised cooking surface.

19. The cooking device of claim 15, wherein the overflow trough includes a bottom wall disposed in a third plane, wherein the third plane is positioned at or below the second plane.

20. The cooking device of claim 15, wherein the overflow trough includes a bottom wall disposed in a third plane, wherein the second plane is positioned below the third plane.

* * * * *